(No Model.) 2 Sheets—Sheet 1.

G. WIRTH.
WIRE DRAWING MACHINE.

No. 440,680. Patented Nov. 18, 1890.

Witnesses
Geo. W. Breck.
Henry W. Lloyd.

Inventor
George Wirth
By his Attorneys
Paget & Kintner

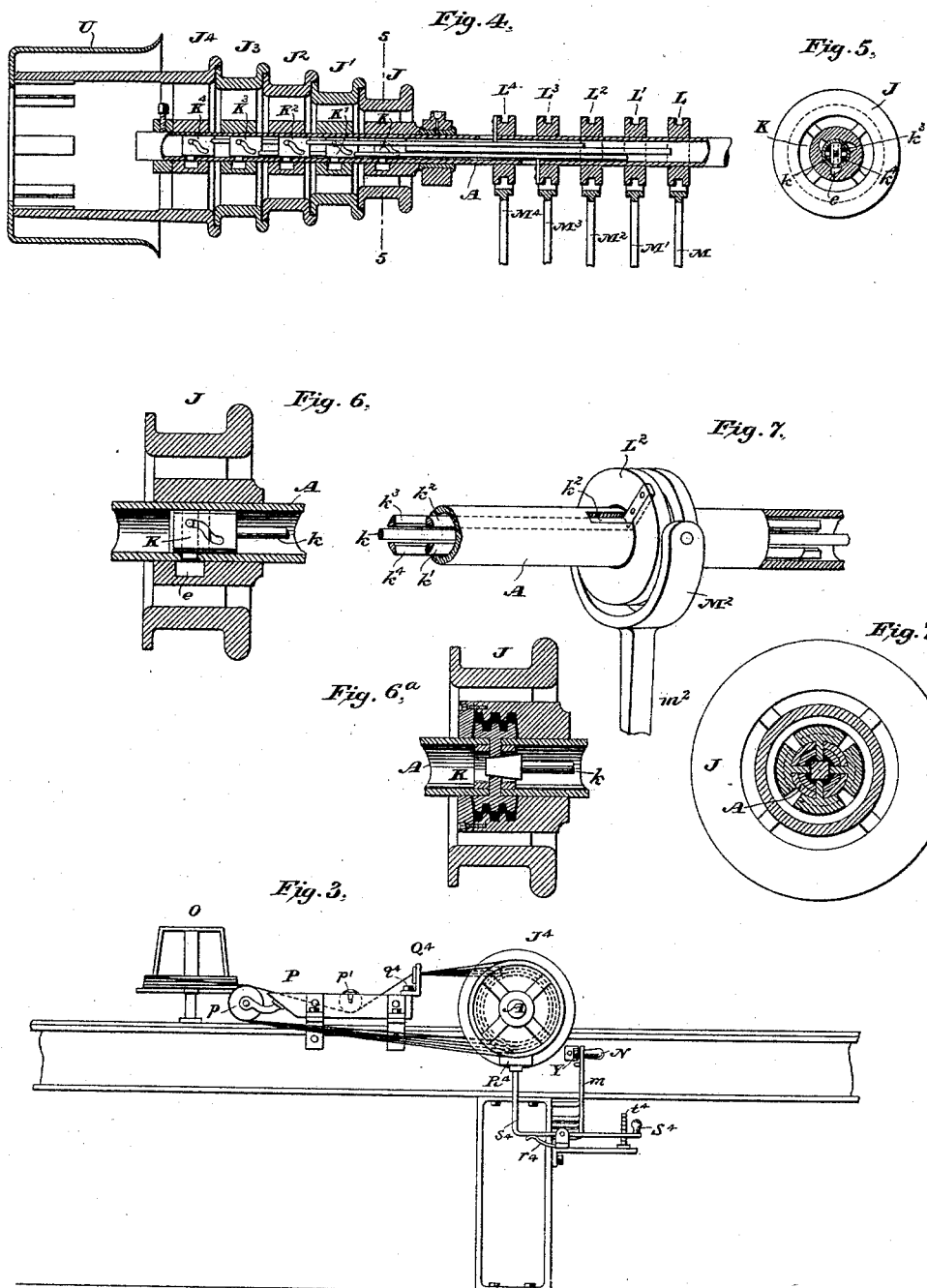

UNITED STATES PATENT OFFICE.

GEORGE WIRTH, OF GRATZ, AUSTRIA-HUNGARY.

WIRE-DRAWING MACHINE.

SPECIFICATION forming part of Letters Patent No. 440,680, dated November 18, 1890.

Application filed January 10, 1890. Serial No. 336,533. (No model.)

*To all whom it may concern:*

Be it known that I, GEORGE WIRTH, a subject of the Emperor of Austria-Hungary, residing at Gratz, in Austria-Hungary, have made a new and useful invention in Wire-Drawing Mechanism, of which the following is a specification.

My invention consists in the novel mechanism hereinafter described, but particularly pointed out in the claims which follow this specification.

For a full understanding of this invention reference is had to the accompanying drawings, in which—

Figure 1:
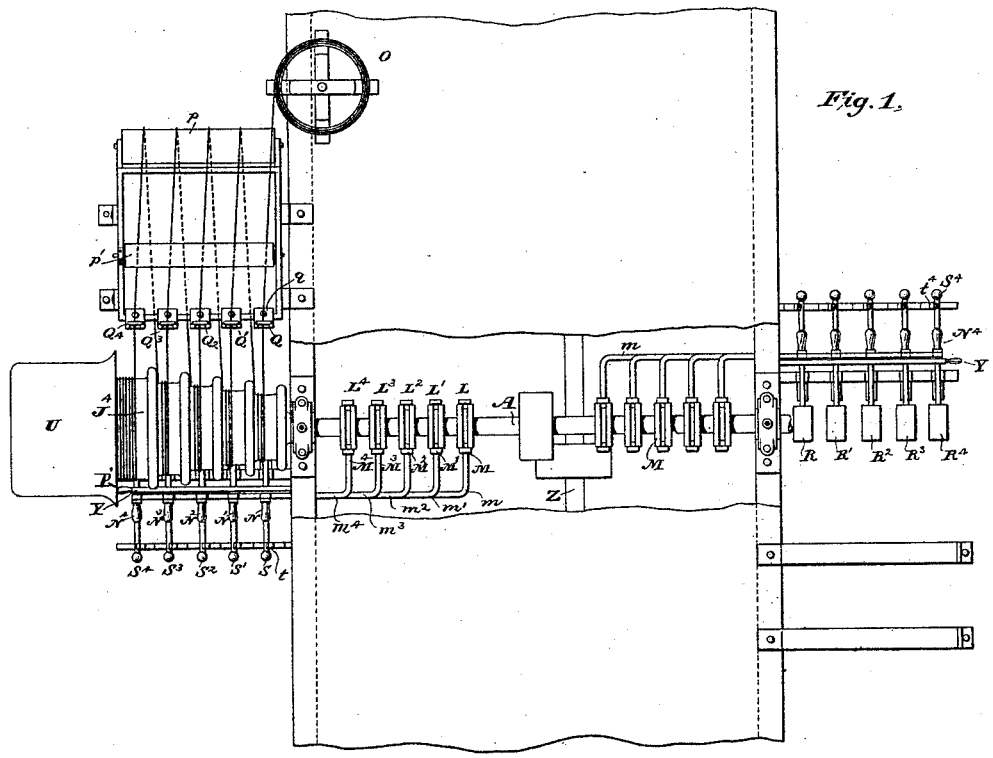
Figure 2:
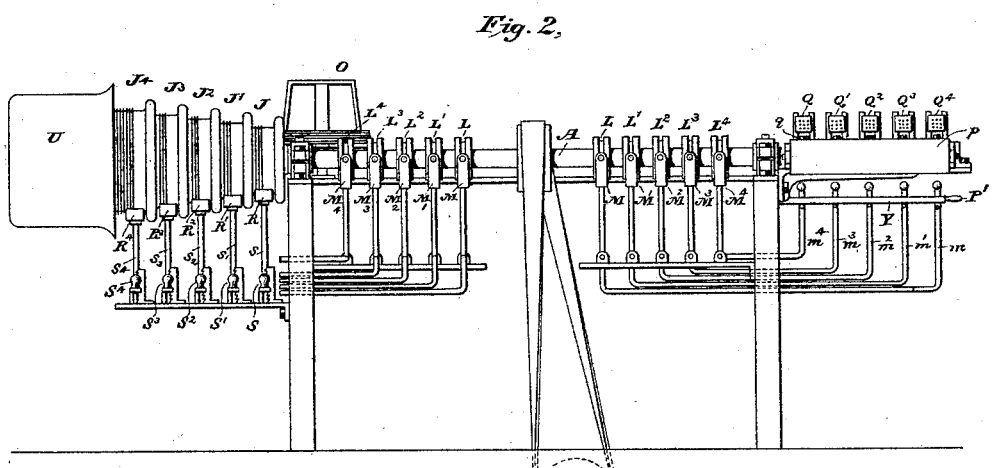

Figure 1 is a plan view of the entire apparatus and Fig. 2 a side view of the same, while Fig. 3 is an end view, as seen by looking at Figs. 1 and 2 from the left to right, with the cap U removed. Fig. 4 is a longitudinal sectional view of the wire-drawing drums and mechanical connections for connecting the same to the rotating shaft at will. Fig. 5 is a cross-sectional view of Fig. 4, taken on line 5 5. Fig. 6 is an enlarged longitudinal sectional view of one of the wire-drawing drums, with the clutch mechanism for connecting the same to the rotating shaft which drives the drums. Fig. 6ª is a similar view with a modified form of clutch mechanism. Fig. 7 is a detail perspective view of a portion of the shafting, showing the clutch-controlling rods and mechanical connections therefor. Fig. 7ª is an end view of the mechanism shown in section in Fig. 6ª.

Like letters of reference represent like parts wherever used throughout this description.

Z is the main driving-shaft, connected to any source of power, (not shown,) and by a belt and pulleys to the hollow shaft A, which drives the entire mechanism. This shafting is journaled in the side frames, as shown in Figs. 1 and 2, and is adapted to run two sets of apparatus, all of that portion to the right of the shaft Z in both Figs. 1 and 2 being the duplicate of the apparatus which I shall now proceed to describe.

J J' J² J³ J⁴ are wire-drawing drums, nested, as shown, and adapted to remain at rest either jointly or independently as the shaft A rotates, or to be connected thereto in either order at will by clutch mechanism. This clutch mechanism consists of a series of sliding blocks controlled by push-blocks K to K⁴, inclusive, said push-blocks being adapted to slide lengthwise in the interior of the hollow shaft A under the influence of the push-rods $k$ to $k^4$, said rods being connected at their outer ends to sleeves L to L⁴, which have inwardly-projecting connections extending through slots, as clearly shown in Figs. 4 and 7. The push-blocks K to K⁴ are provided with grooves in their lateral faces, which act upon pins in the body of the clutch-blocks and force them either into or out of connection with the clutch-walls $e$ of the drums J to J⁴, as clearly shown in Figs. 5 and 6.

M to M⁴ are operating-rods having forked ends provided with pins, which are adapted to run freely in the groove of sleeves L to L⁴. This clutch mechanism and its operative connections constitute the subject-matter of a separate application for a patent bearing Serial No. 336,532, and filed by me in the United States Patent Office of even date herewith, and I make no claim to this feature here.

$m$ to $m^4$ are rods connecting the clutch-controlling rods M to M⁴ with a rack Y, located in convenient proximity to the attendant of the machine, said rack having a handle P and being adapted to operate all of the clutches simultaneously, if desired.

N to N⁴ are individual hand-levers for operating the several clutches individually, as desired.

R to R⁴ are brake-blocks for stopping the rotation of the independent drums J to J⁴, said blocks being held frictionally against the several drums, and also the wire located thereon, by the angular levers $s$ to $s^4$, pivoted, as shown, and provided with springs $r^4$ and racks $t^4$ for regulating the pressure at will. (See Fig. 5.)

U is a hood or cap adjustably secured to the outer drum J for the purpose of protecting the finished wire upon that drum, and for preventing it from working off said drum.

O is a wire-reel carrying the wire to be drawn.

$p$ and $p'$ are guiding-rollers, the latter located in a bath or vessel P containing liquid, and the former secured to the outer side of said vessel.

Q to Q⁴ are wire-drawing dies of usual form, one for each drum J to J⁴, said dies being held in place adjustably by screws $q$ to $q^4$ upon the edge of the bath, as shown in Figs. 1 and 3.

The operation of the apparatus is as follows: The wire to be drawn is placed upon the reel O, and passed from thence over roller $p$ and under roller $p'$ and through the bath and first drawing-die Q, a sufficient length having been drawn through said die to enable the operator or attendant to place several turns thereof around the first drawing-drum J. This drum is then set in motion by connecting it through the agency of lever N and rods $m\ k$ and push-block K, and the motion continued until a sufficient length has been drawn to pass the same from the drum J back under and over the rollers $p$ and $p'$ to the second drawing-die Q', through which it is drawn, and connected in a similar manner with the second drawing-drum J' by a similar manipulation and until a sufficient length is drawn to pass it through the third die Q². This operation is continued in succession until the wire is finally drawn in a completed condition upon the last drum J⁴, the several drums being connected or disconnected to the shaft A at pleasure. After the wire is finally connected to the drum J⁴ all of the drawing-drums are simultaneously connected through their clutches to the shafting A, and the mechanism continues in operation until the drum J⁴ is filled.

It will be noticed that the axial speed of the several drums is the same, and that as the wire passes to successive drums the drawing speed is increased, owing to the increased diameters of the drums, and that this relation is always constant, unless the operator chooses to vary it for any particular drum by connecting or disconnecting that particular drum to or from the rotating shaft.

The modified form of clutch shown in Fig. 6ª is designed for use when it is desired to apply the power gradually. The push-rod $k$ carries a four-sided wedge adapted to spread four radial clutch-blocks and to force them into frictional contact at their outer ends with the grooves on the inner side of the pulley or drum J. This peculiar construction of clutch is claimed also as a clutch in my application No. 336,532, filed of even date herewith. To adapt this clutch for use with multiple drums, like J to J⁴, it would be necessary to nest the rods $k$—that is, they would be concentric and have exterior connections for manipulating them.

Having thus described my invention, what I claim, and desire to secure by Letters Patent of the United States, is—

1. In a wire-drawing machine, two or more wire-drawing drums borne by a common shaft and having their lateral faces in actual contact with each other, in combination with clutch mechanism for connecting either or all of said drums mechanically to the shaft at will, substantially as described.

2. In a wire-drawing machine, two or more wire-drawing drums on a common shaft, in combination with clutch mechanism for connecting said drums to the shaft at will, and brake mechanism, as described, for stopping said drums, substantially as described.

3. In a wire-drawing machine, a series of wire-drawing drums, two or more, adapted to run loosely on a hollow shaft, in combination with clutch mechanism projecting through the shaft and having mechanical connections with the exterior of the shaft, whereby said drums may be operatively connected with the shaft at will, substantially as described.

4. In a wire-drawing machine, a protecting removable hood or cap secured to the last drawing-drum, whereby the finished wire is protected during the process of drawing, substantially as described.

5. In a wire-drawing machine, a series of wire-drawing drums arranged to run loosely on a hollow shaft attached to some source of power, a series of individual clutch-blocks, one for each drum, adapted to slide through the shaft and into frictional contact with said drum, a push-block and push-rod, one for each clutch-block, and mechanical connections between the push-rods and the exterior of the shaft for operating said clutches at will, substantially as described.

6. In a wire-drawing machine, the combination of a series of wire-drawing drums arranged on a hollow shaft, with clutch mechanism projecting through said shaft for connecting the drums to the shaft at will, substantially as described.

GEORGE WIRTH.

Witnesses:
ALBERT ZAMARINN,
AUG. DIETRICH.